Patented Nov. 14, 1939

2,179,787

UNITED STATES PATENT OFFICE 2,179,787

METHOD OF MAKING UNSATURATED CHLORIDES OR BROMIDES AND HALOHYDRIN ESTERS

Charles G. Harford, Quincy, Mass., assignor to Arthur D. Little, Incorporated, Cambridge, Mass., a corporation of Massachusetts No Drawing. Application March 28, 1936, Serial No. 71,446

23 Claims. (Cl. 260—497)

This invention relates to a process for treating unsaturated organic compounds having a tertiary olefinic structure, whereby to convert them into the corresponding unsaturated chlorides or bromides, while maintaining their tertiary structure.

Organic compounds of the type treated herein are characterized by having two of their carbon atoms linked together by a double bond (the olefinic linkage), one of these carbon atoms being also in a tertiary position. In other words, these compounds contain a carbon atom linked to three other carbon atoms only—by single bonds to two of them and by a double bond to the third. Furthermore, the second carbon atom of the double bond has at least one hydrogen atom linked to it. For convenience I shall refer herein to compounds so defined as "tertiary-unsaturated" organic compounds. The linkage between the carbon atoms of a benzene ring, whatever it may be, is not considered a true olefinic linkage either in this invention or in chemistry generally, and is not included herein as such a linkage.

Compounds of the type thus defined to be treated herein include simple tertiary olefines such as isobutylene, the tertiary amylenes (2-methyl butene-1, 2-methyl butene-2); the tertiary-unsaturated hexylenes (2,3-dimethyl butene-1, 2-methyl pentene-1 and -2, and 3-methyl pentene-2); and the homologues in this series; dimers of this series, such as diisobutylene, ditertiary amylene, etc.; cyclic compounds such as pinene and others of the terpene series which have the tertiary-unsaturated linkage defined above; also derivatives of these various compounds, such as the corresponding alcohols, acids, halides, etc. Specifically, the criterion upon which the suitability of a compound for use in the present process is based is the presence of a carbon atom in a tertiary position linked by a double bond to a second carbon atom which has at least one hydrogen atom associated with it, thus:

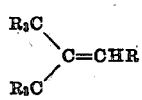

where the R's represent hydrogen, or hydrocarbon radical or other elements or radicals, (or a group of radicals including hydrogen or not). The simplest example of a compound answering this formula is, of course, one where R is always hydrogen—in other words, isobutylene:

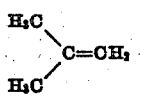

This invention provides a process for halogenating, e. g., chlorinating or brominating the tertiary-unsaturated organic compounds defined herein, whereby tertiary-unsaturated chlorides or bromides are produced, the halogen replacing the hydrogen attached directly to the second double-bond carbon atom.

An object of the invention is to provide the necessary procedure and conditions of operation whereby this process can be performed.

Other objects will be evident from the following specification and the claims.

For convenience and simplicity I shall describe this invention generally as carried out in its chlorinating aspect. It should, however, be understood that I am not restricted to chlorine compounds for bromine compounds are also applicable, and are included equally with the corresponding chlorine compounds.

Processes for the preparation of unsaturated chlorides from unsaturated organic compounds (tertiary or not), using chlorine as the converting agent, are already well known. Such processes are, however, subject to operating difficulties, such as that of securing intimate contact between the gaseous chlorine and the unsaturated compound; the relatively low yields based upon the amount of unsaturated compound; the formation of completely saturated dichlorides under certain conditions; and the tendency to chlorinate at positions remote from the double bond, with the resulting formation of a more or less heterogeneous mixture of a whole series of compounds of different degrees of chlorination—especially when treating the unsaturated compounds which are above the lowest in the series.

The process of this invention is carried out by reacting the tertiary-unsaturated organic compound with a tertiary alkyl hypohalite, e. g., tertiary alkyl hypochlorite or hypobromite, in the presence (or absence) of solvents or of a compound or compounds which are inert with respect to the reactants and the reaction. A catalyst may be added to promote a more rapid reaction, but it is not necessary.

The product which results from carrying out the process of this invention has the same structure as the starting material except that a chlorine or a bromine atom replaces the hydrogen atom which is associated with the second carbon atom having double bond linkage—in other words, the configuration of the product is shown thus

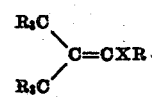

R being the same as already explained, and X representing chlorine or bromine.

The hypochlorite used is characterized by containing a tertiary carbon atom linked to the hypochlorite group, thus:

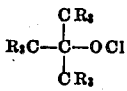

The simplest and most readily available of these compounds is that where all the R's are hydrogens—i. e. tertiary butyl hypochlorite. This invention, however, is not limited thereto, as it is the tertiary carbon-hypochlorite linkage upon which the success of the reaction is based, rather than upon the exact character of R. For simplicity of explanation, however, I will use tertiary butyl hypochlorite in the examples generally, although it shoulde be understood that equivalent compounds—for example, tertiary amyl hypochlorite and tertiary butyl hypobromite, are included.

In my copending application, Serial No. 515,640, filed February 13, 1931, I have described a process for preparing chlorhydrins by reacting an unsaturated organic compound with a tertiary alkyl hypochlorite in the presence of water. The reaction is as follows:

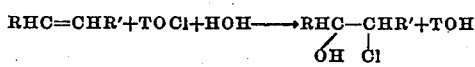

where R and R' are hydrogens or any other organic radicals and T is a tertiary alkyl radical. The criterion of operability of these unsaturated organic compounds to form chlorhydrins is the presence of the ethylenic double-bond linkage (ethylene group). Examples of such compounds which have been successfully treated according to that invention are the simple olefines: ethylene, propylene, and butylenes and the amylenes, etc.; cyclic olefines such as cyclohexene and also other compounds. The linkage between the carbon atoms of the benzene ring, whatever it may be, is not there included under the term "ethylene group" or "ethylenic double bond linkage". A tertiary alcohol, corresponding to the hypochlorite, is a by-product of the above reaction. A small amount of an acid catalyst may be used, if desired, but is not necessary.

In my copending application, Serial No. 686,441, filed August 23, 1933, I have described the same type of reaction but using an organic acid in place of water, whereby a chlorhydrin ester is produced. Thus, when Y is an acyl radical:

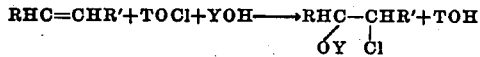

This second equation is equally applicable to both reactions, by noting that in the first case Y is hydrogen, and in the second Y is an acyl radical.

I have found that tertiary-unsaturated organic compounds, when reacted with tertiary alkyl hypochlorites in the presence of water (or an organic acid) form not only the corresponding chlorhydrins (or chlorhydrin esters), in accordance with my copending applications herein above referred to, but also form tertiary unsaturated chlorides. This latter discovery forms the basis of the present invention. This reaction to form the tertiary unsaturated chlorides (or bromides, as the case may be) is conveniently represented by the following equation, using symbols already explained:

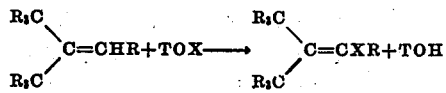

If water is present, chlorhydrins will simultaneously be formed; if an organic acid is present, chlorhydrin esters will simultaneously be formed. If desired, water and organic acids may be omitted entirely, in which case the only reaction is that just described, wherein the tertiary-unsaturated chloride is formed. Nevertheless, the addition of acid not only serves to form the chlorhydrin esters, but also acts catalytically to promote the speed of reaction to form the unsaturated chloride.

Some examples will now be given. These are by way of illustration, and are not limiting as to features such as time, temperature, pressure, order of adding ingredients or other procedure, which the skilled operator can readily change and adjust to suit each particular reaction.

EXAMPLE I

*Preparation of dimethyl vinyl chloride (1-chlor 2-methyl propene-1)*

Tertiary butyl hypochlorite is added slowly to a mixture of isobutylene and acetic acid, all three being in substantially equimolecular proportions. The reaction mixture is kept at about 0° C., in order to maintain the isobutylene in a liquid state, and also to avoid any vaporization which might occur, as the reaction tends to become very vigorous if the temperature is raised. When the reaction is completed, the product consists mainly of dimethyl vinyl chloride (1-chlor 2-methyl propene-1), the chloracetate of isobutylene, and tertiary butyl alcohol, together with any unreacted ingredients such as some acetic acid, and also small quantities of incidental by-products. These various materials may be separated by well known means, thus, by first washing with water, whereby the tertiary butyl alcohol and any unreacted acetic acid are removed, and then fractionally distilling to separate the dimethyl vinyl chloride (B. B. 70–71° C. at atmospheric pressure) and then the chloracetate of isobutylene (B. P. 37–39° C. at 7–8 mm. of mercury pressure, absolute).

Various modifications are possible. For example, the reaction may be carried on at higher temperatures but with superatmospheric pressure, thus similarly maintaining the materials in liquid form. Also, other acids than acetic may be used, either organic or inorganic, so long as they do not damage the reactants or the products. The acid acts as a catalyst, to promote the speed of the major reaction, as well as in forming the chlorhydrin ester, but it may be omitted entirely if desired, whereupon there will of course be no formation of chlorhydrin ester. The unused acid and the tertiary alcohol may be separated out for re-use.

EXAMPLE II

*Preparation of the unsaturated chloride of trimethyl ethylene (2-methyl butene-2)*

To trimethyl ethylene cooled to about −10° C. there are added slowly equimolecular amounts of acetic acid and tertiary butyl hypochlorite, while maintaining the reaction temperature between −10° and 0° C. The reaction is rapid, but readily controlled. After all the acid and hypochlorite have been added, the products are separated. The unused acid and the teritary alcohol may, for example, be removed by water-washing, and the remaining materials are found to consist about two-thirds of the unsaturated chloride, 2-methyl 3-chlor butene-2, and one-third of the chlorhydrin ester; small amounts of by-products, chiefly other hydrocarbon chlorides, may also be present, but may be separated in well-known ways, as by distillation. It is found that only one-third of the acetic acid is used up, which is in accordance with the product being one-third chlorhydrin ester.

If water is substituted for acetic acid, following the process of this example, a similar type of yield is obtained—that is, about two-thirds of the product is the unsaturated chloride and one-third is the chlorhydrin.

EXAMPLE III

*Preparation of the unsaturated chloride (trimethyl chlorpentene) of diisobutylene*

Tertiary butyl hypochlorite is added to an equimolecular quantity of diisobutylene, without special temperature or pressure precautions noted in Examples I and II. As diisobutylene boils at above 100° C., there is no necessity for such precautions to keep it liquid or to avoid volatilization losses. The action will be hastened by the addition of an acid, as shown in the preceding examples, but by omitting the acid, and also having no water present, there will be no formation of chlorhydrins or chlorhydrin esters. With these omitted, the product will consist of the unsaturated chloride and of the tertiary alcohol as a by-product. Diisobutylene is available in two isomeric forms: 2,4,4-trimethyl pentene-1, and 2,4,4-trimethyl pentene-2, either of which is suitable for use in this example. The product is the corresponding mono-chloride, and will be 1-chlor when the former isomer is used and 3-chlor when the latter isomer is used.

In carrying out the present invention, recovery of the tertiary alcohol and reconversion to the corresponding hypochlorite (or hypobromite as the case may be) may be done in accordance with any of the usual and well known procedures for effecting the reaction. For example, the alcohol may be mixed with milk of lime, or a solution of caustic soda, cooled to about 10° C. and treated with chlorine to effect complete conversion. The tertiary hypochlorite, being insoluble in water, is readily separated and washed free from reaction products.

Under certain circumstances it may be desired to carry out this recovery step in the presence of the unsaturated organic compound. This may be done, for example, by treating a mixture of the tertiary-unsaturated organic compound and the tertiary alcohol, with chlorine and milk of lime. Some chlorhydrin will be formed if water is present, as has already been pointed out, but the main reaction is to form the tertiary-unsaturated chlorides.

The foregoing description sets forth the invention in sufficient detail to allow of practical operation of the process upon the general class of materials defined. It should be understood, however, that the invention is not limited to the details of procedure which have been given, which are by way of example, only.

This application is a continuation in part of my copending applications above referred to, Serial No. 515,640, filed February 13, 1931 now U. S. Patent No. 2,107,789 and No. 686,441, filed August 23, 1933 now U. S. Patent No. 2,054,814.

I claim:

1. Process for preparing a tertiary-unsaturated organic halide, comprising reacting a tertiary alkyl hypohalite with an organic compound having in its molecule two carbon atoms linked by an olefinic double bond, one of said carbon atoms being in a tertiary position and the other being linked to at least one hydrogen atom.

2. Process according to claim 1, wherein an acid catalyst is used to promote the reaction.

3. Process according to claim 1, wherein the halides are chlorides and the hypohalite is a hypochlorite.

4. Process according to claim 1, wherein the halides are bromides and the hypohalite is a hypobromite.

5. Process according to claim 1, wherein the halides are chlorides and the hypohalite is tertiary butyl hypochlorite.

6. Process according to claim 1, wherein the reaction is carried out under substantially anhydrous conditions.

7. Process for preparing tertiary-unsaturated organic chlorides, and chlorhydrin esters, comprising reacting a tertiary alkyl hypochlorite and a compound of the formula YOH, wherein Y is an acyl radical, with an organic compound having in its molecule two carbon atoms linked by an olefinic double bond, one of said carbon atoms being in a tertiary position and the other being linked to at least one hydrogen atom, thereby replacing said hydrogen atom with a chlorine atom to give a tertiary unsaturated chloride, in the case of a part of the said organic compound, and, in the case of another part of said organic compound, adding to one of the said two carbon atoms an —OY group and, to the other carbon atom, chlorine, thereby transforming the double bond into a single bond and forming a chlorhydrin ester.

8. Process for preparing tertiary olefin halides, comprising reacting a tertiary alkyl hypohalite with an olefine having one of its carbon atoms at the double bond in a tertiary position and the other linked to at least one hydrogen atom.

9. Process for preparing dimethyl vinyl chloride, comprising reacting a tertiary alkyl hypochlorite with isobutylene.

10. Process for preparing dimethyl vinyl chloride, comprising reacting isobutylene with tertiary butyl hypochlorite in the presence of an acid catalyst under substantially anhydrous conditions.

11. Process for preparing a trimethyl chlor pentene, comprising reacting a tertiary alkyl hypochlorite with 2-4-4 trimethyl pentene.

12. Process for making tertiary butyl alcohol and tertiary-unsaturated organic halides, comprising reacting upon an olefine having a carbon atom in a tertiary position, linked by a double bond to a CH— group, with a tertiary butyl hypohalite, and separating the products of the reaction.

13. Process for making tertiary unsaturated organic bromides, comprising reacting tertiary butyl hypobromite with an organic compound having a tertiary carbon atom attached by a double bond to a carbon atom having at least one hydrogen linked thereto, and separating the products of the reaction.

14. Process for making a tertiary-unsaturated organic halide comprising reacting an organic compound having in its molecule two carbon atoms linked by an olefinic double bond, one of said carbon atoms being in a tertiary position and the other being linked to at least one hydrogen atom, and a reagent containing the hypohalite radical, through the intermediary action of a tertiary alcohol with said hypohalite radical.

15. Process for preparing tertiary-unsaturated organic chlorides and chlorhydrin compounds, comprising reacting a tertiary alkyl hypochlorite in the presence of water, with an organic compound having in its molecule two carbon atoms linked by an olefinic double bond, one of said carbon atoms being in a tertiary position and the other being linked to at least one hydrogen atom, thereby replacing said hydrogen atom with a chlorine atom to give a tertiary unsaturated chloride, in the case of a part of the said organic compound, and in the case of another part of said organic compound, adding to one of said two carbon atoms an —OH group and, to the other carbon atom, chlorine, thereby transforming the double bond into a single bond and forming a chlorhydrin compound.

16. Process according to claim 8, wherein an acid catalyst is used to promote this reaction.

17. Process according to claim 8, wherein the halides are chlorides and the hypohalite is a hypochlorite.

18. Process according to claim 8, wherein the halides are bromides and the hypohalite is a hypobromite.

19. Process according to claim 8, wherein the halides are chlorides and the hypohalite is tertiary butyl hypochlorite.

20. Process according to claim 8, wherein the reaction is carried out under substantially anhydrous conditions.

21. Process for making a tertiary unsaturated hydrocarbon halide, comprising reacting a hydrocarbon compound having in its molecule two carbon atoms linked by an olefinic double bond, one of said carbons being in a tertiary position and the other being linked to at least one hydrogen atom, and alkaline hypohalite through the intermediary action of a tertiary alcohol with said hypohalite.

22. Process for making a tertiary unsaturated hydrocarbon chloride comprising reacting a hydrocarbon compound having in its molecule two carbon atoms linked by an olefinic double bond, one of said carbons being in a tertiary position and the other being linked to at least one hydrogen atom, and alkaline hypochlorite through the intermediary action of a tertiary alcohol with said hypochlorite.

23. Process for making a tertiary unsaturated hydrocarbon chloride, comprising reacting a hydrocarbon compound having in its molecule two carbon atoms linked by an olefinic double bond, one of said carbons being in a tertiary position and the other being linked to at least one hydrogen atom, and calcium hypochlorite through the intermediary action of a tertiary alcohol with said hypochlorite.

CHARLES G. HARFORD.